(12) United States Patent
Furuta

(10) Patent No.: US 12,730,252 B2
(45) Date of Patent: Sep. 8, 2026

(54) EXPOSURE APPARATUS AND IMAGE-FORMING APPARATUS

(71) Applicant: CANON KABUSHIKI KAISHA, Tokyo (JP)

(72) Inventor: Yasutomo Furuta, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 18/788,418

(22) Filed: Jul. 30, 2024

(65) Prior Publication Data

US 2025/0044482 A1 Feb. 6, 2025

(30) Foreign Application Priority Data

Aug. 4, 2023 (JP) ................................ 2023-127999

(51) Int. Cl.
*G02B 3/00* (2006.01)
*B41J 2/447* (2006.01)
*G03G 15/04* (2006.01)

(52) U.S. Cl.
CPC ............. *G02B 3/005* (2013.01); *B41J 2/447* (2013.01); *G03G 15/04036* (2013.01); *G03G 15/0409* (2013.01)

(58) Field of Classification Search
CPC ........... G02B 3/005; B41J 2/447; B41J 2/451; G03G 15/04036; G03G 15/0409; G03G 15/04054
See application file for complete search history.

(56) References Cited

U.S. PATENT DOCUMENTS 7,706,070 B2 * 4/2010 Yamamura ............... B41J 2/451 359/619
2018/0154655 A1 * 6/2018 Iljima ...................... B41J 2/451
2019/0377279 A1 * 12/2019 Yoshida ........... G03G 15/04054
2022/0197177 A1 * 6/2022 Nakanishi ................. B41J 2/45

FOREIGN PATENT DOCUMENTS

JP 2018001679 A 1/2018

* cited by examiner

*Primary Examiner* — Ricardo I Magallanes
*Assistant Examiner* — Natasha Dephenia Quinn
(74) *Attorney, Agent, or Firm* — ROSSI, KIMMS & McDOWELL LLP

(57) ABSTRACT

An exposure apparatus includes a printed circuit board on which light-emitting chips each having a light-emitting element array are arranged in a staggered manner along a reference line that is parallel to an axial direction of a photosensitive member, and a rod lens array that images light from the light-emitting chips onto a surface of the photosensitive member. The rod lens array is constituted by two rows of lenses. The reference line is equidistant from central lines of the first and second lens rows. A proportion of a width of the light-emitting element array in a circumferential direction of the photosensitive member to a lens diameter is about 0.28, and an interval between the reference line and each light-emitting element array belongs to a range from 0.56 to 0.84 times the lens diameter.

6 Claims, 13 Drawing Sheets

N COLUMNS OF LIGHT-EMITTING ELEMENTS 400-2

400-1

D1

D2

400
402
602
406
408-1
408-2
408-3
408-4
408-5
408-6
408-7
408-8
408-9
D1
D2

508
506
504
402
602
W
d
D1
D3

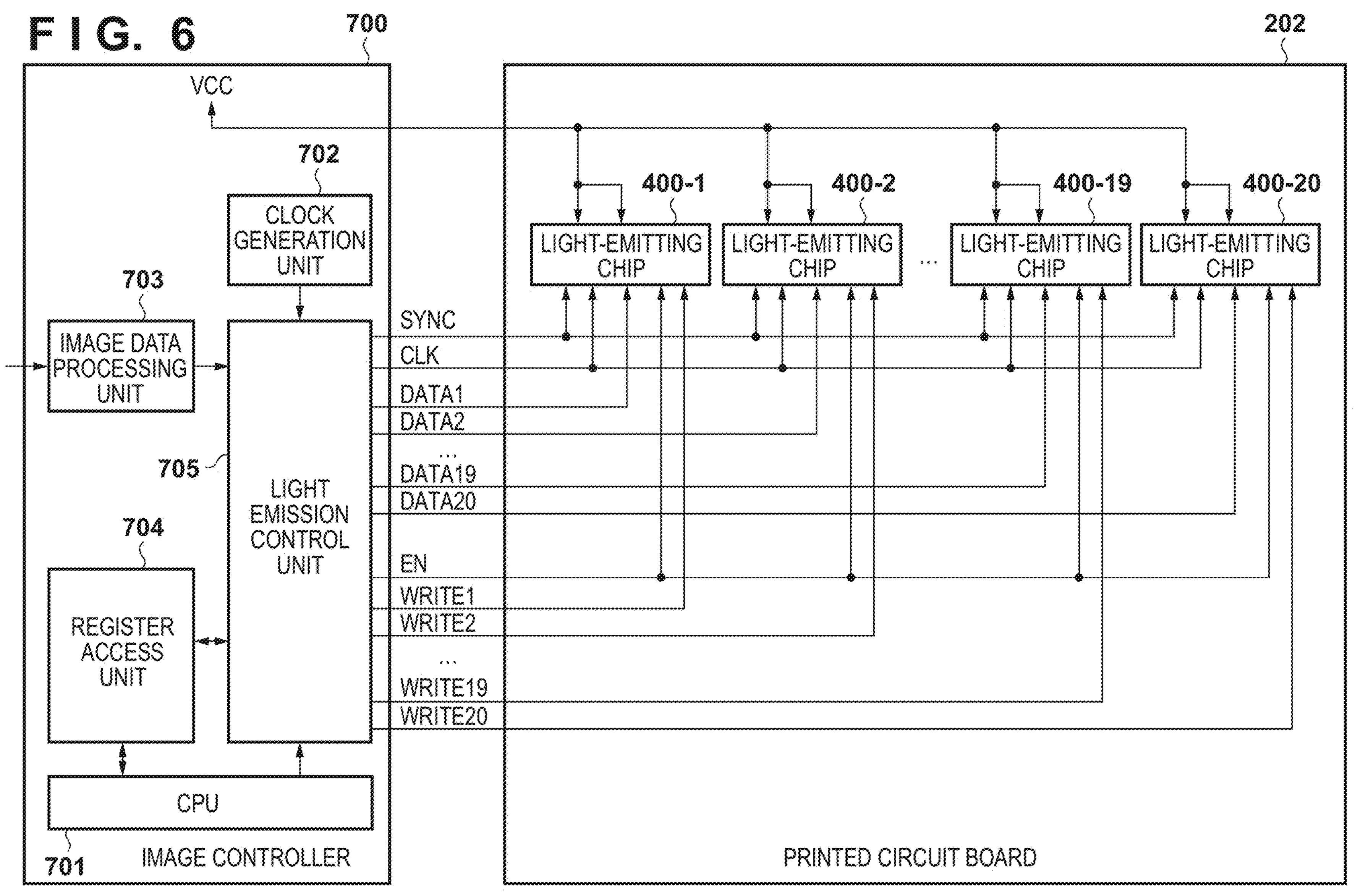
F I G. 6
700
VCC
702
CLOCK GENERATION UNIT
703
IMAGE DATA PROCESSING UNIT
705
LIGHT EMISSION CONTROL UNIT
704
REGISTER ACCESS UNIT
CPU
701
IMAGE CONTROLLER
SYNC
CLK
DATA1
DATA2
DATA19
DATA20
EN
WRITE1
WRITE2
WRITE19
WRITE20
202
400-1
LIGHT-EMITTING CHIP
400-2
LIGHT-EMITTING CHIP
400-19
LIGHT-EMITTING CHIP
400-20
LIGHT-EMITTING CHIP
PRINTED CIRCUIT BOARD

FIG. 7

EN
CLK
WRITEn
3MHz
START BIT
Hi
W
WRITE IDENTIFICATION BIT
AD1 [3]
AD1 [2]
AD1 [1]
AD1 [0]
D1[7]
D1[6]
D1[5]
D1[4]
D1[3]
D1[2]
D1[1]
D1[0]
ADDRESS
DATA 105.8us
30MHz
CLK
2992clk
SYNC
DATA1
DATA2
D VCC
408-1
408-2
400
406
CIRCUIT PORTION
1004-748
410
408-4
408-3
DATA-1
DATA-2
DATA-3
DATA-4
FOR-WARDING UNIT
1003
REGISTER
1102
LATCH UNIT
LAT1
1004-001
LAT3
1004-002
LAT747
1004-747
CURRENT DRIVE UNIT
1104
LIGHT-EMITTING LAYER
UPPER ELECTRODE
504
506
508
408-5
408-6
408-7
408-8
408-9
CLK
SYNC
DATAn
EN
WRITEn DN
WC
310
203a
203a
410
400
400
203b
203b
L
410
WC
DN
D2
D1

LIGHT TRANSMITTANCE RATE
1.1
1
0.9
0.8
0.7
0.6
0.5
0
0.1
0.2
0.3
POSITION X (DIRECTION D1)
[mm]
1001
1002
▲ : 212 μm FROM REFERENCE LINE
● : 296 μm FROM REFERENCE LINE

EXPOSURE APPARATUS AND IMAGE-FORMING APPARATUS

BACKGROUND OF THE INVENTION

Field of the Invention

The present invention relates to an exposure apparatus and an image-forming apparatus.

Description of the Related Art

An electrophotographic image-forming apparatus forms an image by exposing a rotationally-driven photosensitive member with light to form an electrostatic latent image on it and developing the electrostatic latent image with toner. Among others, a solid-state exposure type exposure apparatus, that images light from a light-emitting element array onto a surface of a photosensitive member utilizing a rod lens array, is attracting attention because its downsizing, enhancing quietness, and cost reduction are easier compared to a laser-scanning type exposure apparatus.

Japanese Patent Laid-Open No. 2018-1679 discloses an example of a solid-state exposure type exposure apparatus. In the exposure apparatus of Japanese Patent Laid-Open No. 2018-1679, a plurality of light-emitting chips each including an array of light-emitting diodes (LED) are arranged in a staggered manner in parallel with an axial direction of a photosensitive member so as to eliminate gaps between the light-emitting chips. Japanese Patent Laid-Open No. 2018-1679 suggests suppressing unevenness in an image (unevenness in light amount) due to differences in light amount among the light-emitting chips by correcting the light amount based on a result of reading a test chart.

SUMMARY OF THE INVENTION

However, the unevenness in light amount is not only caused by the differences in light amount among the light-emitting chips. For example, light transmittance rate of a rod lens array depends on the position from which the light is incident, and is not necessarily spatially uniform. Hence, where to arrange a light-emitting element array relative to a rod lens array determines a degree of unevenness in light amount, however, there has been no known proposal to optimize the arrangement of the light-emitting element array from the viewpoint of light transmittance rate of the rod lens array.

The present invention aims at optimizing an arrangement of a light-emitting element array relative to a rod lens array to suppress unevenness in light amount of an exposure apparatus.

According to an aspect, there is provided an exposure apparatus including: a printed circuit board on which a plurality of light-emitting chips each having a light-emitting element array are arranged in a staggered manner along a reference line that is parallel to an axial direction of a photosensitive member; and a rod lens array configured to image light from the plurality of light-emitting chips onto a surface of the photosensitive member. The rod lens array is constituted by two rows of lenses arranged in a close-packed manner. The reference line is equidistant from a central line of a first lens row and a central line of a second lens row of the rod lens array on the printed circuit board. A proportion of a width of the light-emitting element array in a circumferential direction of the photosensitive member to a lens diameter of the rod lens array is about 0.28, and an interval between the reference line and each light-emitting element array belongs to a range from 0.56 to 0.84 times the lens diameter. There is also provided an image-forming apparatus including the exposure apparatus and the photosensitive member.

Further features of the present invention will become apparent from the following description of exemplary embodiments (with reference to the attached drawings).

BRIEF DESCRIPTION OF THE DRAWINGS

FIG. 3A is a first illustrative diagram for a configuration of a printed circuit board of the exposure head according to an embodiment;

FIG. 3B is a second illustrative diagram for a configuration of the printed circuit board of the exposure head according to an embodiment;

FIG. 6 is a circuit diagram showing a control configuration of an exposure apparatus according to an embodiment;

FIG. 7 is a signal chart related to access to a register of the light-emitting chip according to an embodiment;

DESCRIPTION OF THE EMBODIMENTS

Figure 1:
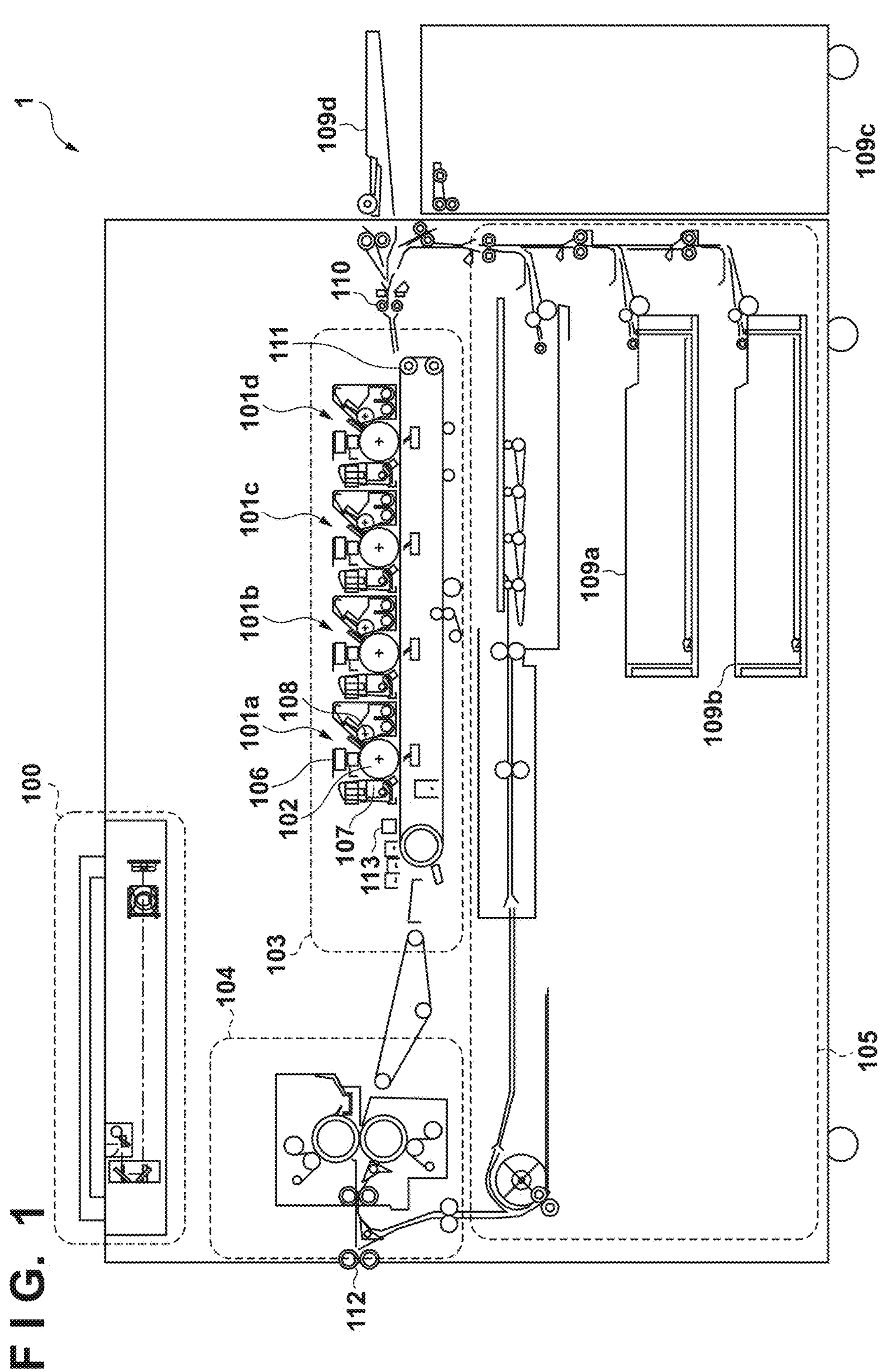
FIG. 1 is a configuration diagram showing a schematic configuration of an image-forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Schematic Configuration of Image-Forming Apparatus

FIG. 1 shows an example of a schematic configuration of an image-forming apparatus 1 according to an embodiment. The image-forming apparatus 1 includes a reading unit 100, an image-making unit 103, a fixing unit 104, and a transport unit 105. The reading unit 100 optically reads an original placed on a platen and generates read image data. The image-making unit 103 forms an image on a sheet based on the read image data generated by the reading unit 100 or based on print image data received from an external device via a network, for example.

The image-making unit 103 includes image-forming units 101*a*, 101*b*, 101*c*, and 101*d*. The image-forming units 101*a*, 101*b*, 101*c*, and 101*d* form toner images in black, yellow, magenta, and cyan, respectively. The image-forming units 101*a*, 101*b*, 101*c* and 101*d* have the same configuration, and are also referred to collectively as image-forming units 101 below. A photosensitive member 102 of the image-forming unit 101 is driven to rotate in the clockwise direction in the figure during image formation. A charger 107 electrically charges the photosensitive member 102. An exposure head 106 exposes the photosensitive member 102 with light to form an electrostatic latent image on a surface of the photosensitive member 102. A developer 108 develops the electrostatic latent image on the photosensitive member 102 with toner to form a toner image. The toner image formed on the surface of the photosensitive member 102 is transferred to a sheet that is being transported on a transfer belt 111. A color image containing four color components, namely black, yellow, magenta, and cyan can be formed by transferring the toner images of the four photosensitive members 102 to the sheet in a superimposed manner.

The transport unit 105 controls feed and transport of sheets. Specifically, the transport unit 105 feeds a sheet from a unit designated from among internal storage units 109*a* and 109*b*, an external storage unit 109*c*, and a manual feed unit 109*d* to a transport path in the image-forming apparatus 1. The fed sheet is transported to a registration roller 110. The registration roller 110 transports the sheet onto the transfer belt 111 at an appropriate timing such that the toner image of each photosensitive member 102 is transferred to the sheet. As mentioned above, the toner images are transferred to the sheet while the sheet is transported on the transfer belt 111. The fixing unit 104 fixes the toner images to the sheet by heating and pressurizing the sheet to which the toner images have been transferred. After the toner images have been fixed, the sheet is discharged to outside the image-forming apparatus 1 by a discharge roller 112. An optical sensor 113 is located at a position facing the transfer belt 111. The optical sensor 113 optically reads a test chart formed on the transfer belt 111 by the image-forming units 101. In a case where an error in an image-forming range is detected for the test chart read by the optical sensor 113, an image controller 700 described below performs control for compensating for the error when executing subsequent jobs.

Although an example in which the toner image is directly transferred from each photosensitive member 102 to the sheet on the transfer belt 111 has been described here, the toner image may alternatively be transferred indirectly from each photosensitive member 102 to the sheet via an intermediate transfer member. Further, although an example of forming a color image using toner of multiple colors has been described here, the technology according to the present disclosure is also applicable to an image-forming apparatus that forms a monochrome image using toner of a single color.

2. Configuration Example of Exposure Head

Figure 2A:
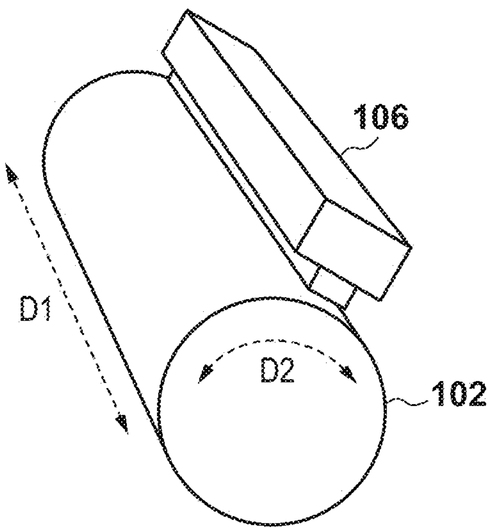
FIG. 2A is a first illustrative diagram for a configuration of a photosensitive member and an exposure head according to an embodiment.
Figure 2B:
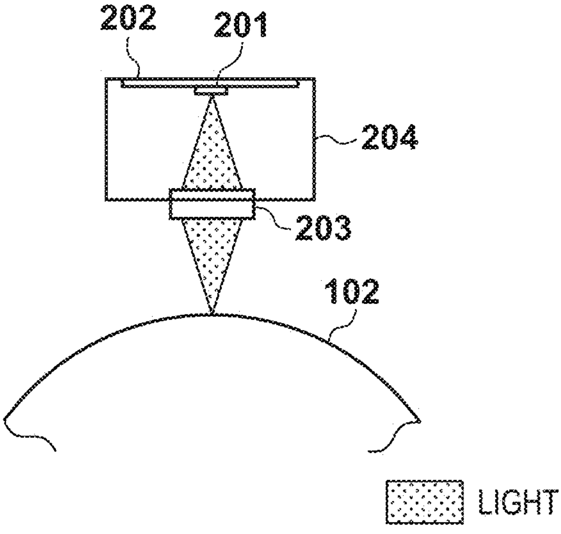
FIG. 2B is a second illustrative diagram for a configuration of the photosensitive member and the exposure head according to an embodiment.

FIGS. 2A and 2B show the photosensitive member 102 and the exposure head 106. The exposure head 106 includes a light-emitting element array 201, a printed circuit board 202 on which the light-emitting element array 201 is mounted, a rod lens array 203, and a housing 204 supporting the printed circuit board 202 and the rod lens array 203. The photosensitive member 102 has a cylindrical shape. The exposure head 106 is arranged such that the longitudinal direction thereof is parallel to an axial direction D1 of the photosensitive member 102, and a face of the exposure head 106 to which the rod lens array 203 is attached faces the surface of the photosensitive member 102. While the photosensitive member 102 rotates in a circumferential direction D2, the light-emitting element array 201 of the exposure head 106 emits light, and the rod lens array 203 images the light onto the surface of the photosensitive member 102.

Figures 3A, 3B:
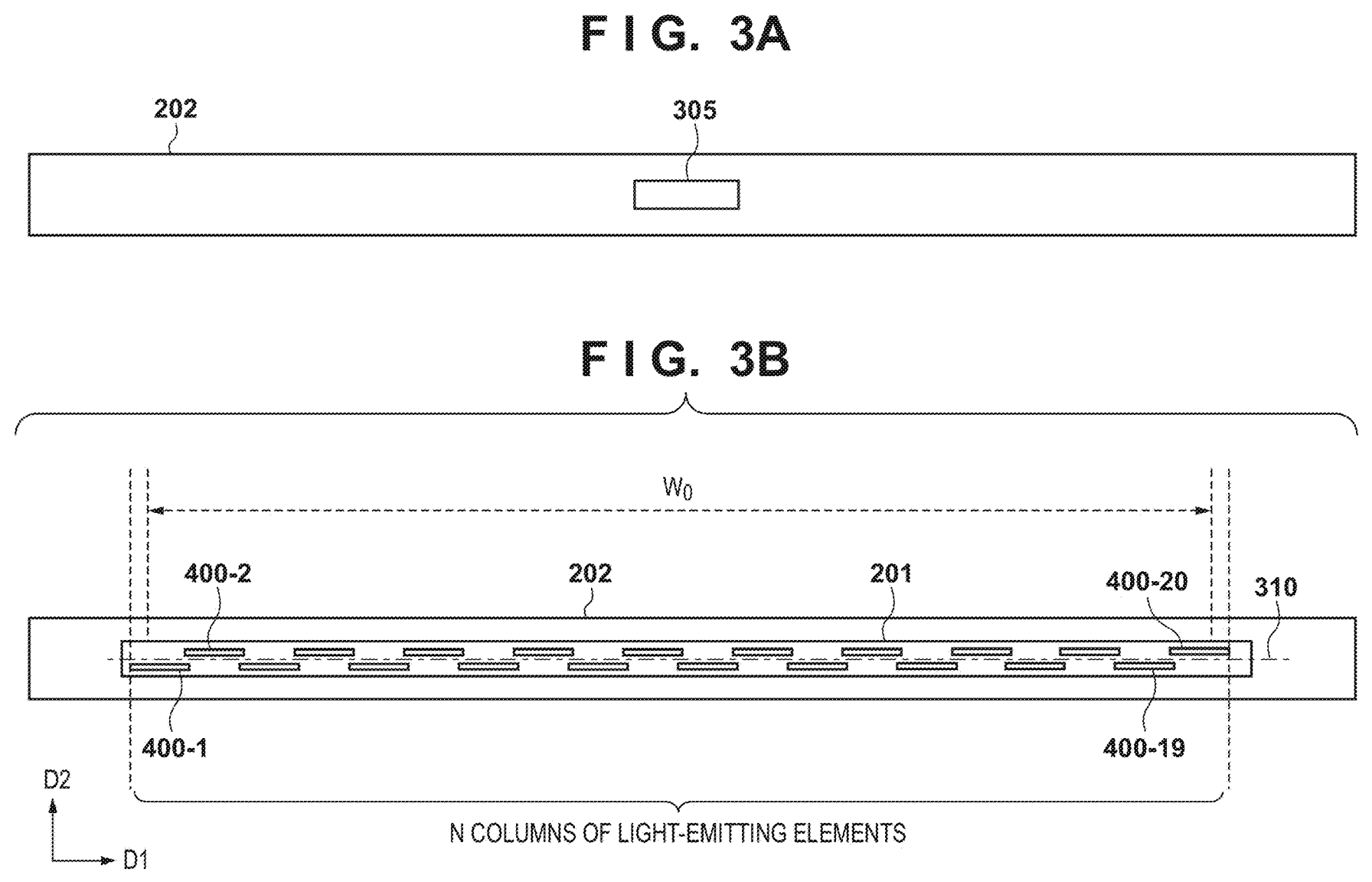

FIGS. 3A and 3B show an example of a configuration of the printed circuit board 202. Note that FIG. 3A shows a face on which a connector 305 is mounted, and FIG. 3B shows a face on which the light-emitting element array 201 is mounted (a face on the side opposite to the face on which the connector 305 is mounted).

In the present embodiment, the light-emitting element array 201 has a plurality of light-emitting elements that are arranged two-dimensionally. The light-emitting element array 201 as a whole includes light-emitting elements in N columns in the axial direction D1 and M rows in the circumferential direction D2 of the photosensitive member, where M and N are integers no less than two. In the example of FIG. 3B, the light-emitting element array 201 is constituted by separate twenty light-emitting chips 400-1 to 400-20, each of which includes a subset of the entire plurality of light-emitting elements. The light-emitting chips 400-1 to 400-20 are arranged in a staggered manner along a reference line 310 that is parallel to the axial direction D1. The light-emitting chips 400-1 to 400-20 are also referred to collectively as light-emitting chips 400. As illustrated in FIG. 3B, the range occupied by the entire light-emitting elements of the twenty light-emitting chips in the axial direction D1 is wider than the range occupied by the maximum width $W_0$ of input image data. Accordingly, some light-emitting elements located at both ends in the axial direction D1 may not be used for exposing the photosensitive member 102 unless an error in the image-forming range is detected. Each light-emitting chip 400 on the printed circuit board 202 is connected to the image controller 700 (FIG. 6) via the connector 305. In the following, there are cases where the smaller branch number side of the light-emitting chips 400-1 to 400-20 arranged in the axial direction D1 is referred to as "left" and the larger branch number side as "right", for convenience of description. For example, the light-emitting chip 400-1 is a light-emitting chip 400 at the left end, and the light-emitting chip 400-20 is a light-emitting chip at the right end.

Figure 4:
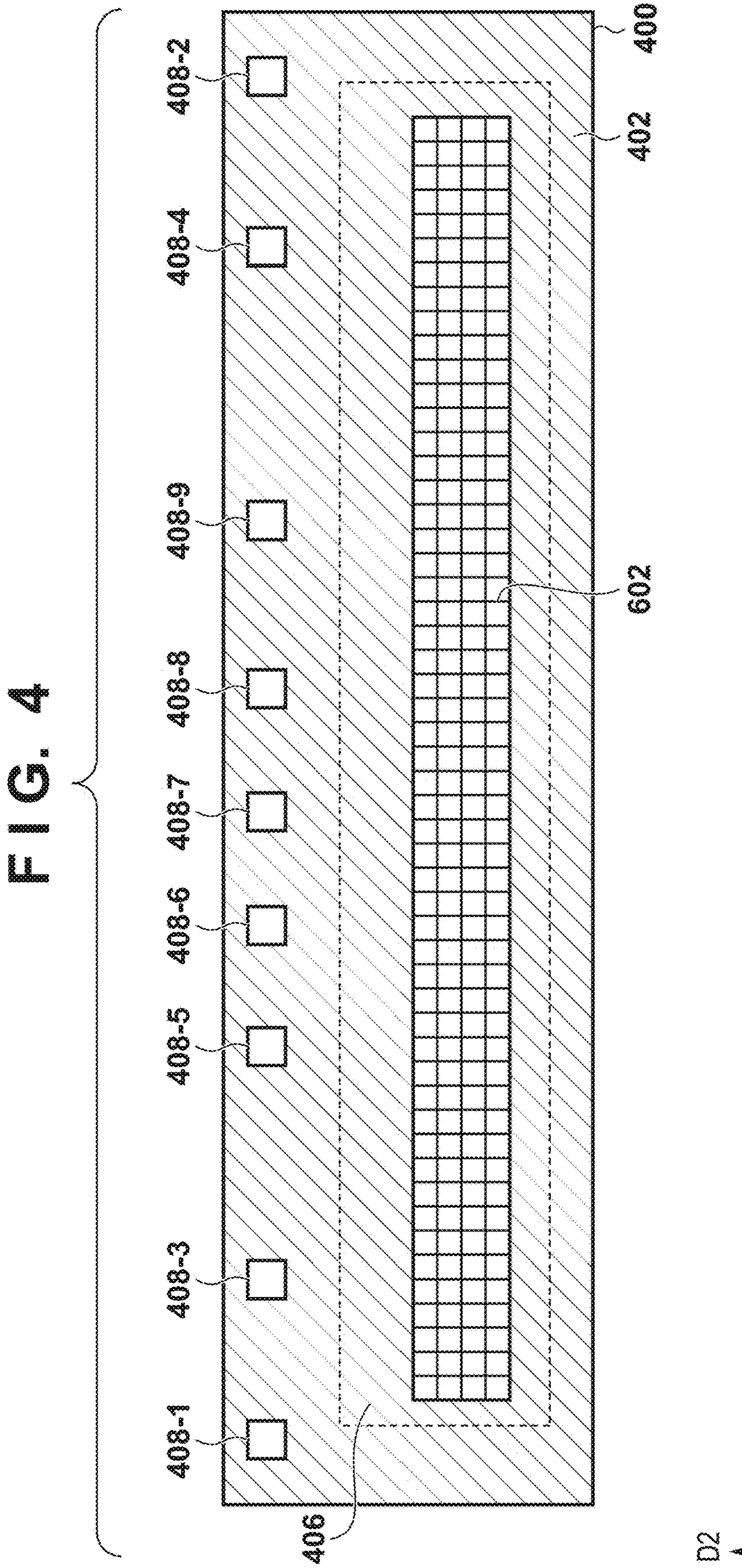
FIG. 4 is a plan view showing a schematic configuration of the light-emitting chip according to an embodiment.

FIG. 4 is a plan view of a schematic configuration of one light-emitting chip 400. The plurality of light-emitting elements 602 of each light-emitting chip 400 are formed on a light-emitting substrate 402, which is a silicon substrate, for example. The light-emitting substrate 402 has a circuit section 406 for driving the plurality of light-emitting elements 602. Pads 408-1 to 408-9 are connected to signal lines for communicating with the image controller 700, power lines for connection with power supplies, and ground lines for connection with ground. The signal lines, the power lines, and the ground lines may be gold wires, for example.

The number J of light-emitting elements 602 arranged in each row of one light-emitting chip 400 (J=N/20) may be equal to 748 (J=748), for example. Meanwhile, the number M of light-emitting elements 602 arranged in each column of one light-emitting chip 400 may be equal to 4 (M=4), for example. That is to say, in an example embodiment, each light-emitting chip 400 has 2992 (=748*4) light-emitting elements 602 in total, with 748 elements in the axial direction D1 and 4 elements in the circumferential direction D2. The interval between central points of light-emitting elements 602 adjoining in the circumferential direction D2 may be about 21.16 μm corresponding to a resolution of 1200 dpi, for example. The interval between central points of light-emitting elements 602 adjoining in the axial direction D1 may also be about 21.16 μm and, in this case, 748 light-emitting elements 602 occupy the length of about 15.8 mm in the axial direction D1. It should be noted that, for convenience of description, FIG. 4 shows an example where the light-emitting elements 602 are arranged completely in a grid-like pattern in each light-emitting chip 400, however, the M (M=4) light-emitting elements 602 of each column may be arranged in a staircase pattern or in a partially-staircase pattern. The arrangement of light-emitting elements 602 in a staircase pattern will be further described below.

Figure 5:
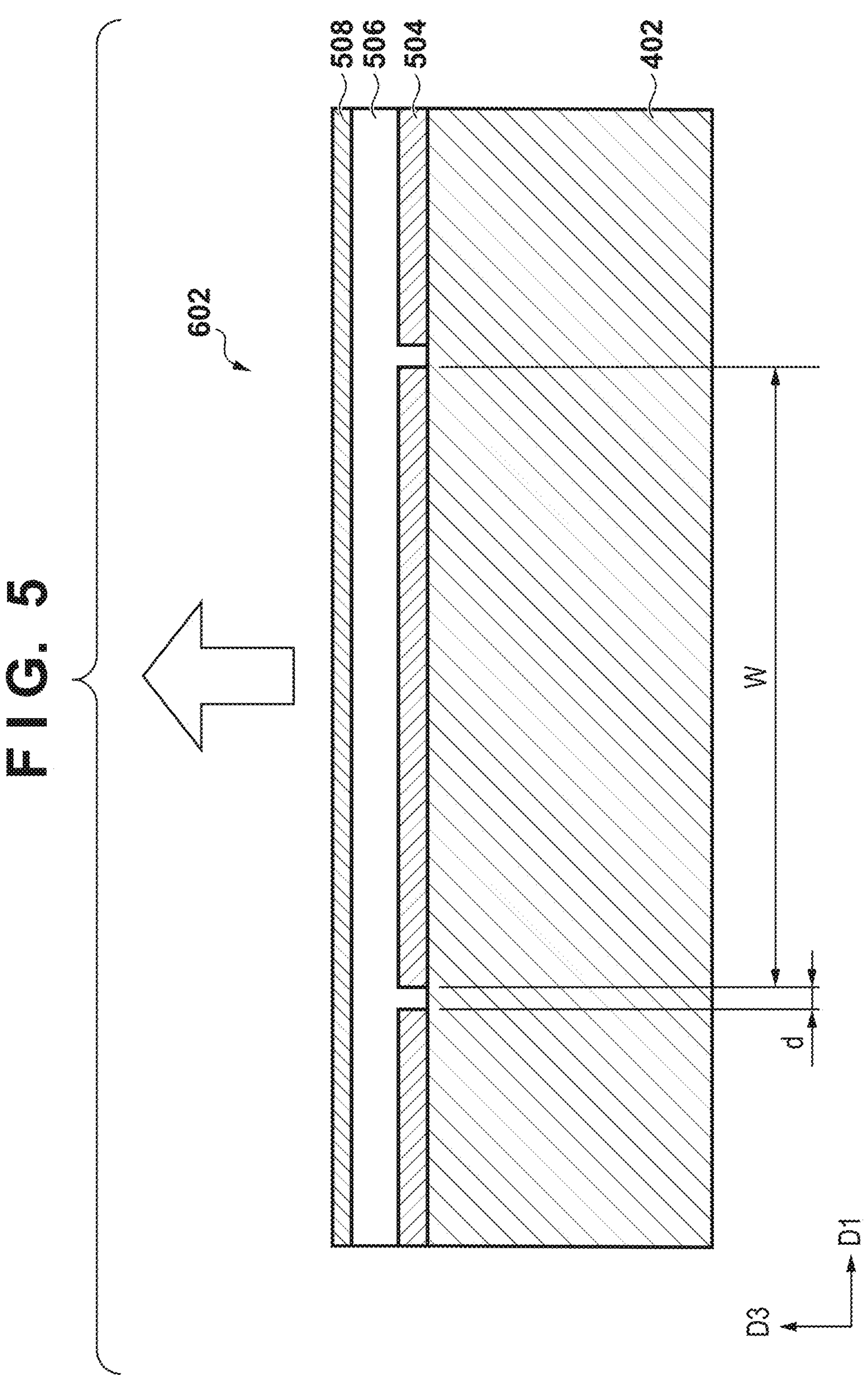
FIG. 5 is a cross-sectional view showing an example of a configuration of a light-emitting element according to an embodiment.

FIG. 5 is a cross-sectional view showing an example of a configuration of the light-emitting element 602. A plurality of lower electrodes 504 are formed on the light-emitting substrate 402 which is a silicon substrate. A gap with length d is provided between two adjoining lower electrodes 504. A light-emitting layer 506 is provided on the lower electrodes 504, and an upper electrode 508 is provided on the light-emitting layer 506. The upper electrode 508 is one common electrode for the plurality of lower electrodes 504. When a voltage is applied between the lower electrodes 504 and the upper electrode 508, the light-emitting layer 506 emits light as a result of electric current flowing from the lower electrodes 504 to the upper electrode 508. Thus, one lower electrode 504 and partial regions of the light-emitting layer 506 and the upper electrode 508 that correspond to the lower electrode 504 constitute one light-emitting element 602. That is, in the present embodiment, the light-emitting substrate 402 includes a plurality of light-emitting elements 602.

An organic EL film is used as the light-emitting layer 506. That is, the light-emitting element 602 is an organic EL element. The upper electrode 508 is constituted by a transparent electrode made of indium tin oxide (ITO) or the like, for example, so as to allow the light-emission wavelength of the light-emitting layer 506 to pass through. Note that, in the present embodiment, the entire upper electrode 508 allows the light-emission wavelength of the light-emitting layer 506 to pass through, but the entire upper electrode 508 does not necessarily allow the light-emission wavelength to pass through. Specifically, it is sufficient that a partial region through which light from each light-emitting element 602 passes allows the light-emission wavelength to pass through.

Note that, in FIG. 5, one continuous light-emitting layer 506 is formed, but a plurality of light-emitting layers 506 each having a width equal to the width W of a corresponding lower electrode 504 may alternatively be formed on the respective lower electrodes 504. Further, in FIG. 5, the upper electrode 508 is formed as one common electrode for the plurality of lower electrodes 504; but, a plurality of upper electrodes 508 each having a width equal to the width W of a corresponding lower electrode 504 may alternatively be formed in correspondence with the respective lower electrodes 504. Further, a first plurality of lower electrodes 504, out of the lower electrodes 504 of each light-emitting chip 400, may be covered by a first light-emitting layer 506, and a second plurality of lower electrodes 504 may be covered by a second light-emitting layer 506. Similarly, a first upper electrode 508 may be formed in common for a first plurality of lower electrodes 504, out of the lower electrodes 504 of each light-emitting chip 400, and a second upper electrode 508 may be formed in common for a second plurality of lower electrodes 504. With such a configuration as well, one lower electrode 504 and regions of the light-emitting layer 506 and the upper electrode 508 that correspond to the lower electrode 504 constitute one light-emitting element 602.

FIG. 6 is a circuit diagram related to a control configuration for controlling the light-emitting chips 400. The image controller 700 is a control circuit that communicates with the printed circuit board 202 via a plurality of signal lines (wires). The image controller 700 includes a CPU 701, a clock generation unit 702, an image data processing unit 703, a register access unit 704, and a light emission control unit 705. The light emission control unit 705 terminates the signal lines connected to the printed circuit board 202. An n-th light-emitting chip 400-*n* (n is an integer from 1 to 20) on the printed circuit board 202 is connected to the light emission control unit 705 via a signal line DATAn and a signal line WRITEn. The signal line DATAn is used to transmit image data from the image controller 700 to the light-emitting chip 400-*n*. The signal line WRITEn is used by the image controller 700 to write control data to a register of the light-emitting chip 400-*n*.

One signal line CLK, one signal line SYNC, and one signal line EN are also provided between the light emission control unit 705 and respective light-emitting chips 400. The signal line CLK is used to transmit a clock signal for data transmission over the signal lines DATAn and WRITEn. The light emission control unit 705 outputs, to the signal line CLK, a clock signal generated based on a reference clock signal from the clock generation unit 702. Signals transmitted to the signal line SYNC and the signal line EN will be described below.

The CPU 701 controls the entire image-forming apparatus 1. The image data processing unit 703 performs image processing on image data received from the reading unit 100 or an external device, and generates image data in a binary bitmap format for performing control to turn on and off light emission of the light-emitting elements 602 of the light-emitting chips 400 on the printed circuit board 202. Image processing here may include, for example, raster conversion, gradation correction, color conversion, and halftoning. The image data processing unit 703 transmits the generated image data as input image data to the light emission control unit 705. The register access unit 704 receives control data to be written in a register within each light-emitting chip 400 from the CPU 701 to transmit it to the light emission control unit 705.

Figure 7:
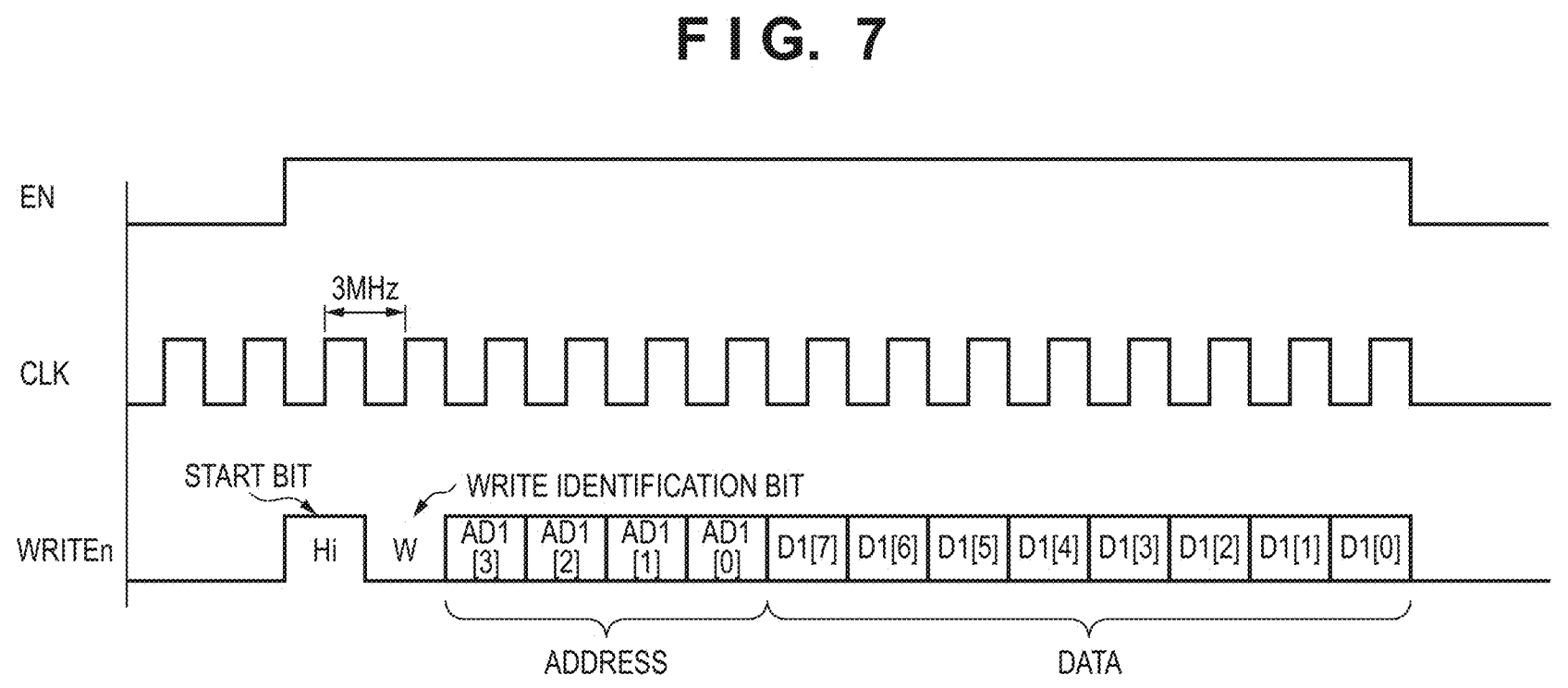

FIG. 7 shows transition of the signal level on each signal line when writing control data to the register of the light-emitting chip 400. An enable signal, which is at high level during communication, indicating that communication is in progress, is output to the signal line EN. The light emission control unit 705 transmits a start bit to the signal line WRITEn synchronously with the rise of the enable signal. Next, the light emission control unit 705 transmits a write identification bit indicating a write operation, and thereafter transmits an address (four bits in this example) of the register to which control data is to be written, and the control data (eight bits in this example). The light emission control unit 705 sets the frequency of the clock signal transmitted to the signal line CLK to, for example, 3 MHz when writing to the register.

Figure 8:
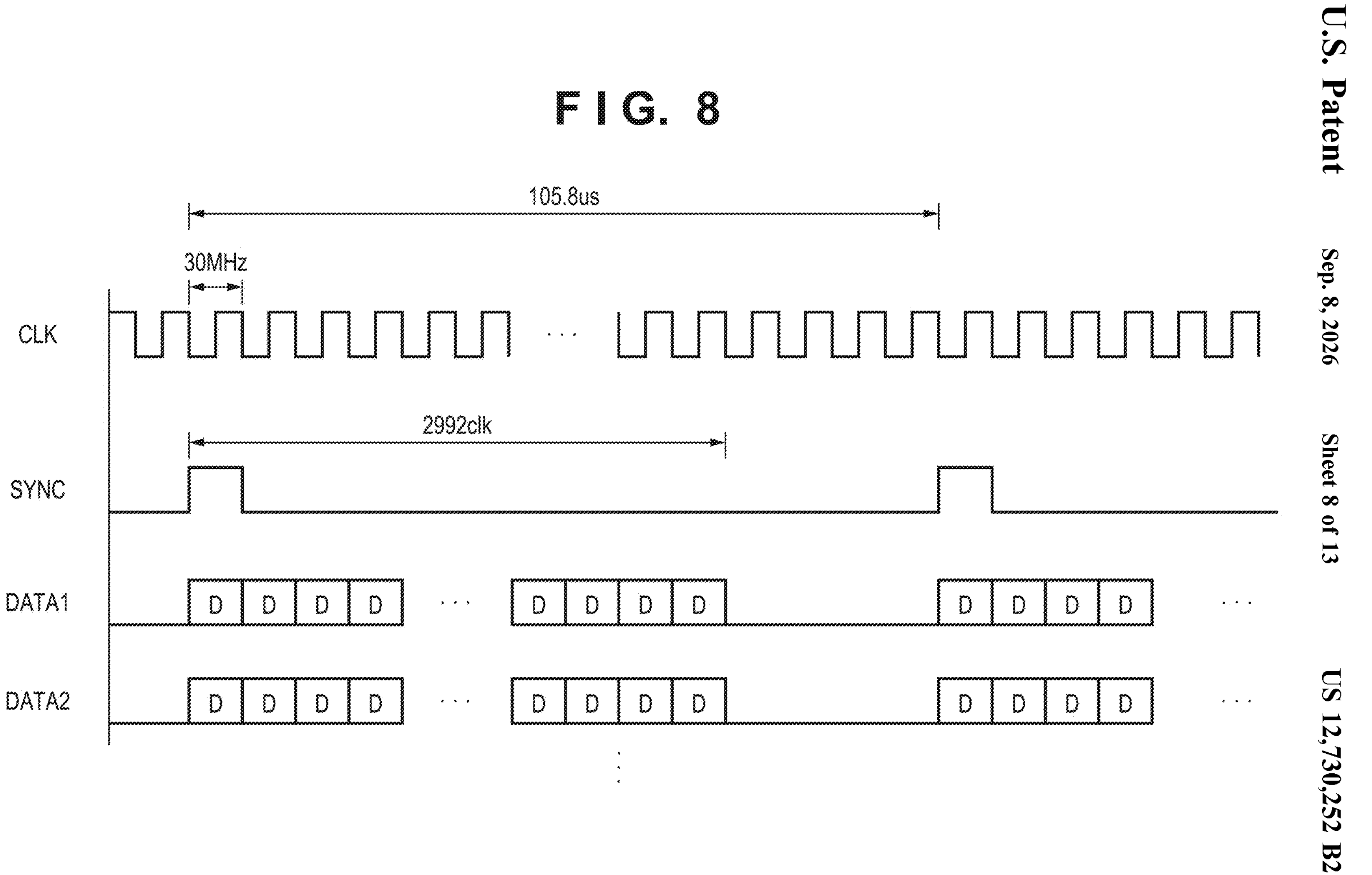
FIG. 8 is a signal chart related to transmission of image data to the light-emitting chip according to an embodiment.

FIG. 8 shows transition of the signal level on each signal line when image data is transmitted to each light-emitting chip 400. A periodic line synchronization signal, which indicates an exposure timing for each line in the photosensitive member 102, is output to the signal line SYNC. When the circumferential velocity of the photosensitive member 102 is 200 mm/s and the resolution in the circumferential direction is 1200 dpi (about 21.16 μm), the line synchronization signal is output at intervals of about 105.8 μs. The light emission control unit 705 transmits image data to the signal lines DATA1 to DATA20 synchronously with the rise of the line synchronization signal. Since each light-emitting chip 400 in the present embodiment has 2992 light-emitting elements 602, image data indicating whether or not to cause each of the 2992 light-emitting elements 602 to emit light needs to be transmitted to each light-emitting chip 400 within a period of about 105.8 μs. Therefore, in this example, the light emission control unit 705 sets the frequency of the clock signal transmitted to the signal line CLK to 30 MHz when transmitting the image data, as shown in FIG. 8.

Figure 9:
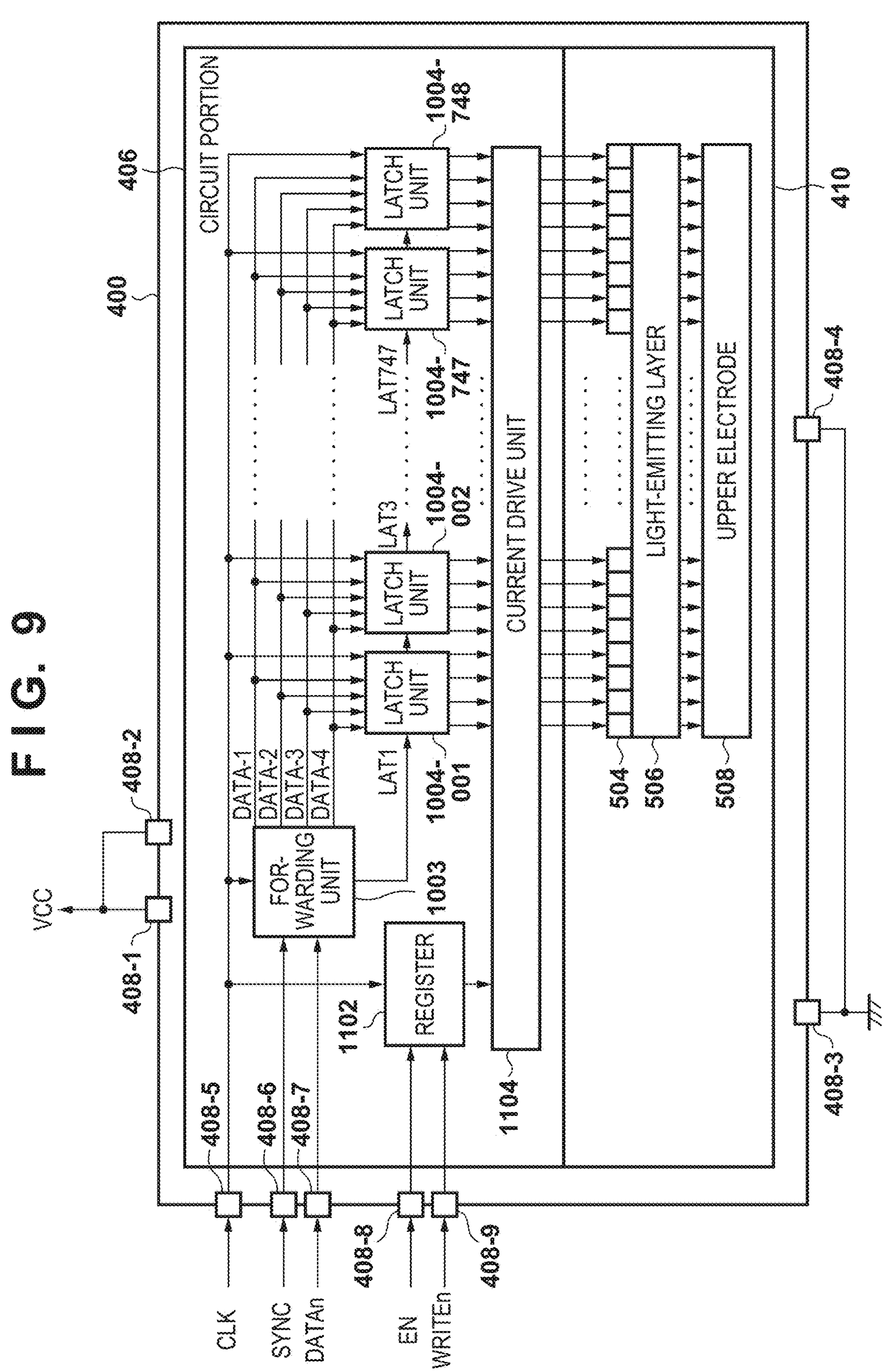
FIG. 9 is a functional block diagram showing a detailed circuit configuration of the light-emitting chip according to an embodiment.

FIG. 9 is a functional block diagram showing a detailed circuit configuration of one light-emitting chip 400 (n-th light-emitting chip 400-*n*). The light-emitting chip 400 has nine pads 408-1 to 408-9, a circuit portion 406, and a light-emitting element array 410. The pads 408-1 and 408-2 are connected to a power supply voltage VCC through a power line. Power from this power supply voltage VCC is supplied to each circuit of the circuit portion 406 of the light-emitting chip 400. The pads 408-3 and 408-4 are connected to a ground through a ground line. Each circuit of the circuit portion 406 and the upper electrode 508 are connected to a ground via the pads 408-3 and 408-4. The signal line CLK is connected to a forwarding unit 1003, a register 1102, and latch units 1004-001 to 1004-748 via the pad 408-5. The signal lines SYNC and DATAn are connected to the forwarding unit 1003 via the pads 408-6 and 408-7. The signal lines EN and WRITEn are connected to the register 1102 via the pads 408-8 and 408-9. The register 1102 stores control data indicating a magnitude of driving current to be supplied to each light-emitting element 602, for example Starting from the line synchronization signal from the signal line SYNC, the forwarding unit 1003 receives, from the signal line DATAn, input image data that includes a series of pixel values indicating whether or not to cause each one of the light-emitting elements 602 to emit light, synchronously with the clock signal from the signal line CLK. The forwarding unit 1003 performs serial-to-parallel conversion in units of M (e.g., M=4) pixel values for the series of pixel values received serially from the signal line DATAn. For example, the forwarding unit 1003 has four cascaded D flip-flops, and outputs the pixel values DATA-1, DATA-2, DATA-3, and DATA-4 that are input over four clocks to the latch units 1004-001 to 1004-748 in parallel. The forwarding unit 1003 also has another four D flip-flops for delaying the line synchronization signal, and outputs a first latch signal to the latch unit 1004-001 via a signal line LAT1 at a timing delayed for four clocks after the line synchronization signal is input.

A k-th latch unit 1004-*k* (k is an integer from 1 to 748) holds, using a latch circuit, the four pixel values DATA-1, DATA-2, DATA-3, and DATA-4 that are input from the forwarding unit 1003 simultaneously with the input of a k-th latch signal. The k-th latch unit 1004-*k*, except for the last latch unit 1004-748, delays the k-th latch signal for four clocks and outputs a (k+1)-th latch signal to a latch unit 1004-(*k*+1) via a signal line LAT(k+1). The k-th latch unit 1004-*k* continues to output drive signals based on the four pixel values held by the latch circuit to a current drive unit 1104 during the signal period of the k-th latch signal. For example, there is a delay of four clocks between the timing when the first latch signal is input to the latch unit 1004-1 and the timing when the second latch signal is input to the latch unit 1004-2. Therefore, the latch unit 1004-1 outputs drive signals based on the first, second, third, and fourth pixel values to the current drive unit 1104, while the latch unit 1004-2 outputs drive signals based on the fifth, sixth, seventh, and eighth pixel values to the current drive unit 1104. In general, the latch unit 1004-*k* outputs drive signals based on (4k−3)-th, (4k−2)-th, (4k−1)-th, and (4k)-th pixel values to the current drive unit 1104. Therefore, in the embodiment shown in FIG. 9, the 748 latch units 1004-001 to 1004-748 transmit, substantially in parallel, 2992 drive signals for controlling driving of 2992 (=748*4) light-emitting elements 602 to the current drive unit 1104. Each drive signal is a binary signal that indicates high level or low level.

The current drive unit 1104 has 2992 light emission drive circuits respectively corresponding to 2992 light-emitting elements 602 of the light-emitting element array 410. Each light emission drive circuit causes a driving current having a magnitude indicated by control data in the register 1102 to flow to the light-emitting layer 506 of the corresponding light-emitting element 602 while the corresponding drive signal indicates high level meaning that light emission should be ON. As a result, the light-emitting elements 602 emit light at the target amount of light. Note that the control data may indicate one individual current value for each light-emitting element 602, indicate one current value for each group of light-emitting elements 602, or indicate one current value in common to all light-emitting elements 602.

3. Multiple Exposure Control

Figure 10:
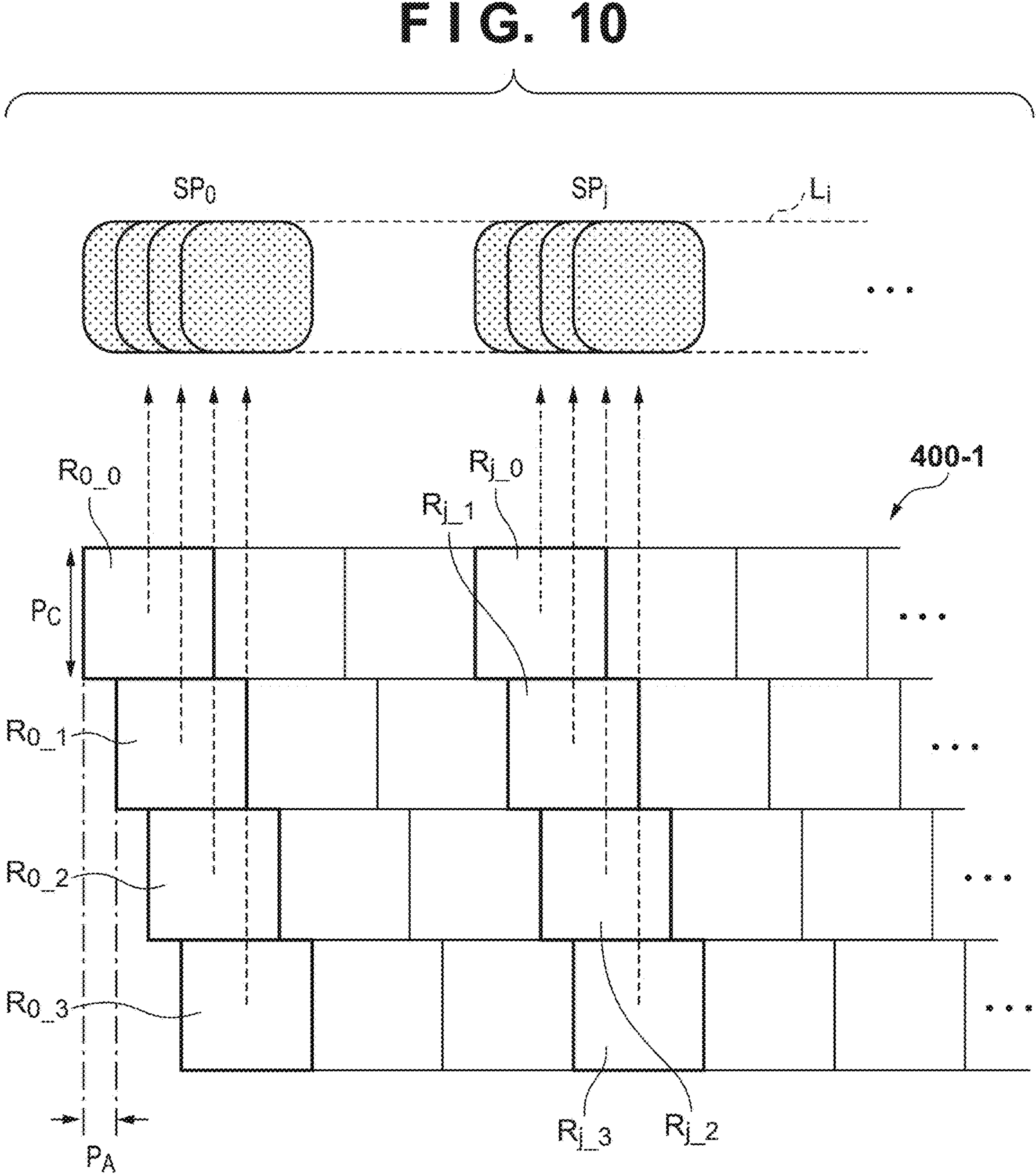
FIG. 10 is an illustrative diagram regarding multiple exposure with light-emitting elements arranged in a staircase pattern.

Although FIG. 4 shows an example where the light-emitting elements 602 are arranged completely in a grid-like pattern in each light-emitting chip 400, the M light-emitting elements 602 of each column may be arranged in a staircase pattern with a constant pitch. FIG. 10 is an illustrative diagram regarding multiple exposure performed with light-emitting elements arranged in a staircase pattern. Here, an example of an arrangement of light-emitting elements in the light-emitting chip 400-1 is partially illustrated where M=4. $R_{j\_m}$ (j={0, 1, . . . , J−1}, m={0, 1, 2, 3}) in the figure represents a light-emitting element 602 in a j-th column from the left in the axial direction and an m-th row from the top in the circumferential direction. The pitch Pc of the light-emitting elements in the circumferential direction may be about 21.16 μm, as mentioned above. The interval in the axial direction between two adjoining light-emitting elements of the M light-emitting elements in each column, that is, the pitch $P_A$ of the light-emitting elements in the axial direction may be about 5 μm corresponding to the resolution of 4800 dpi.

As the four light-emitting elements in each column are arranged in the staircase pattern in this manner, any two adjoining light-emitting elements among those four light-emitting elements occupy partially overlapping ranges in the axial direction. The four light-emitting elements in a column corresponding to each pixel position on input image data successively emit light while the photosensitive member 102 rotates, thereby forming a spot corresponding to the pixel position on the surface of the photosensitive member 102. In the example in FIG. 10, when the pixel value at the left end of an i-th line of input image data indicates that light emission should be ON, light-emitting elements $R_{0\_0}$, $R_{0\_1}$, $R_{0\_2}$, and $R_{0\_3}$ successively emit light at timings at which the respective light-emitting elements face a line Li on the surface of the photosensitive member 102. As a result, the spot region at the left end of the line Li is subjected to multiple exposure, and a corresponding spot $SP_0$ is formed. Similarly, when a j-th pixel value from the left end of the i-th line of the input image data indicates that light emission should be ON, light-emitting elements $R_{j\_0}$, $R_{j\_1}$, $R_{j\_2}$, and $R_{j\_3}$ successively emit light at timings at which the respective light-emitting elements face the line Li on the surface of the photosensitive member 102. As a result, a j-th spot region from the left end of the line Li is subjected to multiple exposure, and a corresponding spot SP; is formed.

In FIG. 10, the light-emitting elements in adjoining two columns occupy partially overlapping ranges and, likewise, the light-emitting elements in two columns located at a boundary of adjoining two light-emitting chips 400 also occupy partially overlapping ranges in the axial direction. That is, within the adjoining two light-emitting chips 400, the light-emitting elements of the right-end column of the left light-emitting chip 400 and the light-emitting elements of the left-end column of the right light-emitting chip 400 also occupy partially overlapping ranges in the axial direction. The pitch $P_A$ of the light-emitting elements in the axial direction is constant at about 5 μm throughout the entire twenty light-emitting chips 400. As a result of four light-emitting elements in each column of these light-emitting chips 400 successively emitting light at appropriate timings, a smooth line of an electrostatic latent image that is constituted by a series of spots with a constant spot interval that partially overlap with each other may be formed on the surface of photosensitive member 102. Then, a two-dimensional electrostatic latent image is produced as a result of such lines being continuously formed in the circumferential direction.

4. Arrangement of Light-Emitting Element Array Relative to Rod Lens Array

In general, when there is spatial unevenness in light amount of an exposure head, deterioration in image quality appears in a printed image in the form of unevenness in density. In particular, unevenness in an axial direction of a photosensitive member (also referred to as a main scanning direction) will result in deterioration in image quality that can be easily sensed visually as a stripe of the image. One of factors that cause the unevenness in light amount is that light transmittance rate of a rod lens array is not spatially uniform. A rod lens array typically has a structure in which a large number of columnar rod lenses are arranged in a close-packed manner in a plane that is perpendicular to the optical axis. Hence, in the plane perpendicular to the optical axis, the light transmittance rate of the rod lens array presents a property that is not spatially uniform but varies cyclically depending on from which position the light is incident, and the cycle is relevant to the diameter of the lenses. Therefore, where to arrange the light-emitting element array relative to the rod lens array will determine a degree of unevenness in light amount.

Figure 11:
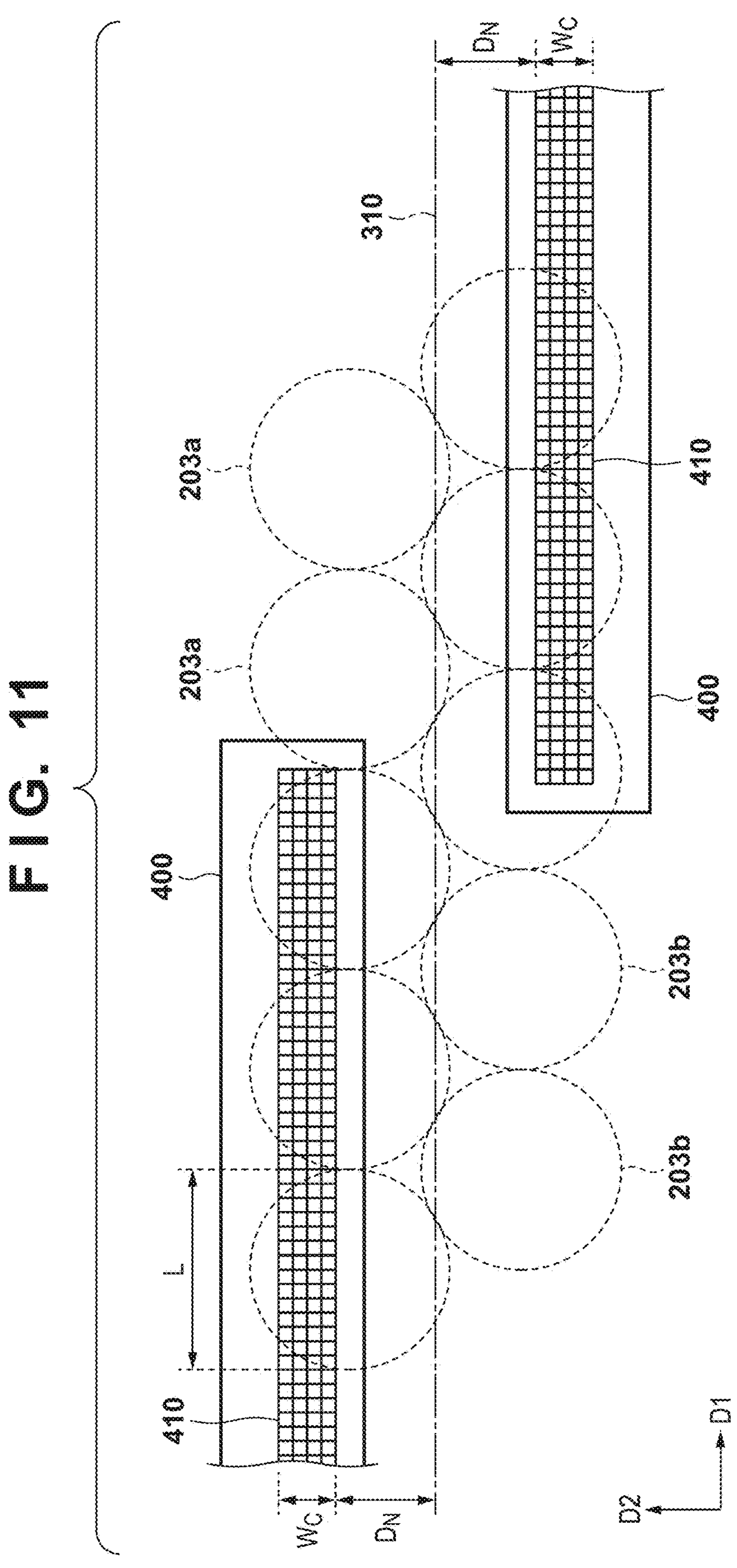
FIG. 11 is an illustrative diagram for positional relationship between a rod lens array and a light-emitting element array.

FIG. 11 is an illustrative diagram for positional relationship between the rod lens array 203 and the light-emitting element array 410 of the light-emitting chip 400. In the present embodiment, the rod lens array 203 is constituted by multiple rows of lenses arranged in a close-packed manner so that intake efficiency of light into the imaging plane is enhanced. In particular, the number of lens rows is set to two, which allows for suppressing assembling variance at the time of manufacturing. The lenses 203*a* lined up in the axial direction D1 constitute a first lens row, and the lenses 203*b* also lined up in the axial direction D1 constitute a second lens row. On the printed circuit board 202, the reference line 310 is equidistant from the central line of the first lens row and the central line of the second lens rows (when viewed in a direction perpendicular to the circuit board). This reference line 310 will be used as a reference when arranging the plurality of light-emitting chips 400 in a staggered manner. The lens diameter L is common to all of the lenses 203*a* and the lenses 203*b*.

The length of the light-emitting element array 410 of the light-emitting chip 400 in the axial direction D1 is sufficiently large compared to the lens diameter L. Thus, whichever position the light-emitting element array 410 is arranged at in the axial direction D1, the cyclic variation in the light transmittance rate of the rod lens array 203 appears over the length of the light-emitting element array 410 in the axial direction D1. On the other hand, the width $W_C$ of the light-emitting element array 410 (the length in the circumferential direction D2) is smaller than the lens diameter L. For example, as described above, the width $W_C$ of the light-emitting element array 410 in which four light-emitting elements 602 are arranged at the pitch of about 21.16 μm in the circumferential direction D2 is about 84 μm while the lens diameter L is about 300 μm. In this case, the cyclic variation in the light transmittance rate of the rod lens array 203 will take a different mode depending on at which position the light-emitting element array 410 is arranged in the circumferential direction D2.

Figure 12:
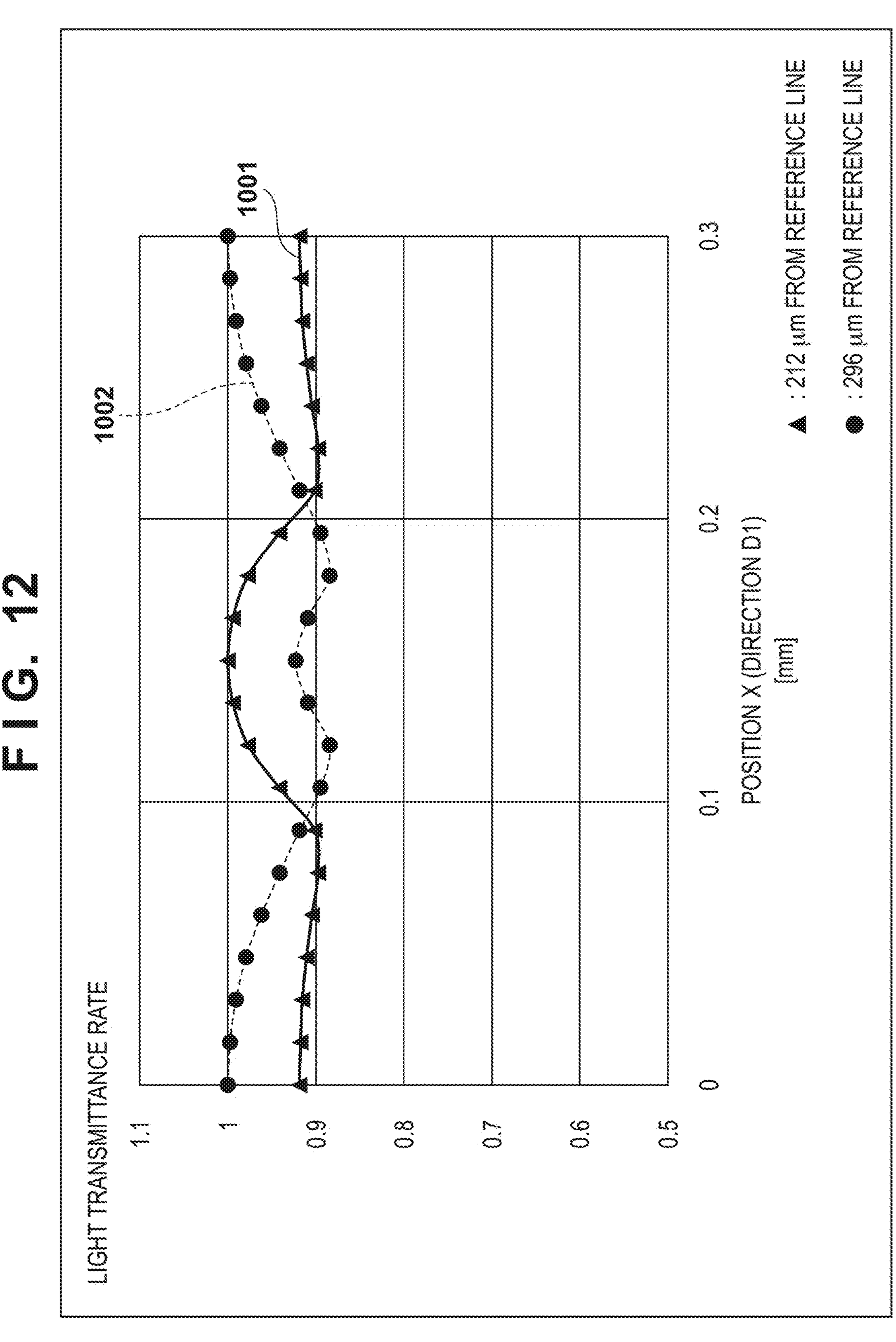
FIG. 12 is a graph showing light transmittance rate distributions of a rod lens array measured at two different positions in a direction perpendicular to a reference line.

FIG. 12 shows light transmittance rate distributions of the rod lens array 203 measured at two different positions in a direction perpendicular to the reference line 310 (that is, the circumferential direction D2). The horizontal axis of the graph in FIG. 12 represents the position X [mm] in the axial direction D1 within one cycle of the shape of the lenses. The vertical axis represents a proportion of transmitted amount of light to the maximum amount of light. The graph 1001 plotted with triangular marks represents a light transmittance rate distribution in the axial direction D1 measured at the position away from the reference line 310 by the distance of 212 μm. The graph 1001 shows a phase variation in a first pattern in which the light transmittance rate is maximum at X=0.15 mm. The graph 1002 plotted with circular marks represents a light transmittance rate distribution in the axial direction D1 measured at the position away from the reference line 310 by the distance of 296 μm. The graph 1002 shows a phase variation in a second pattern in which the light transmittance rate is maximum at X=0 mm. The graph 1002 shows the light transmittance rate of about 0.93 at X=0.15 mm where the light transmittance rate is the maximum in the graph 1001. The graph 1001 shows the light transmittance rate of about 0.92 at X=0 mm where the light transmittance rate is the maximum in the graph 1002. That is, the phase variation in the graph 1002 can be considered as being roughly opposite to the phase variation in the graph 1001. The unevenness in light amount in the axial direction D1 can be suppressed by arranging the light-emitting element array 410 to cover two such positions in the circumferential direction D2 at which the phase variations in the light transmittance rate distributions are opposite to each other, as a result that the phase variations are at least partially canceled by each other.

Figure 13:
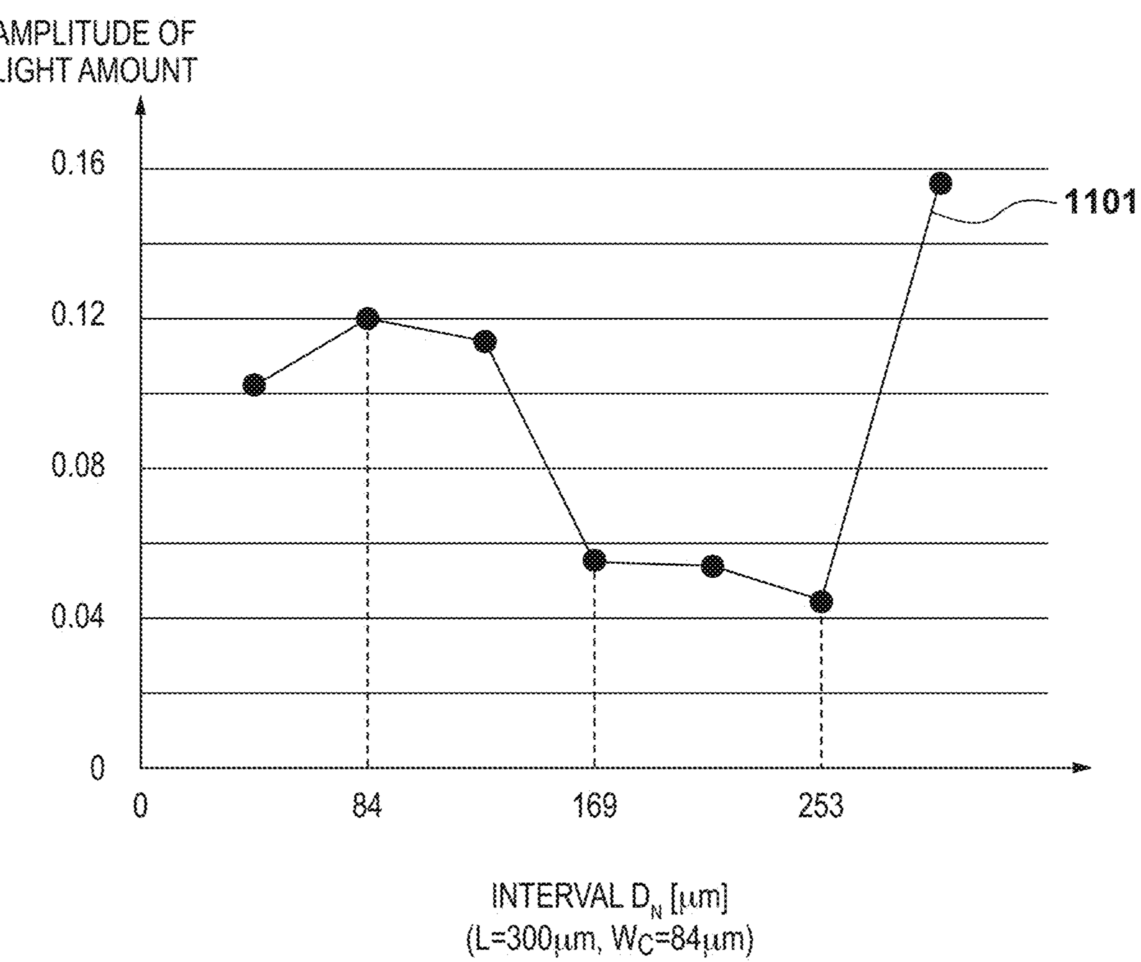
FIG. 13 is a graph showing amplitudes of light amount depending on an interval between the reference line and the light-emitting element array measured under a certain condition.

Herein, as shown in FIG. 11, the interval between the reference line 310 and the light-emitting element array 410 of each light-emitting chip 400 is denoted by $D_N$. When an origin is set at the reference line 310, the light-emitting element array 410 spans over the range from $D_N$ to $D_N+W_C$ in the circumferential direction D2. The effect of suppressing the unevenness in light amount resulting from mutual cancellation of phase variations can be obtained when two positions at which the phase variations in the light transmittance rate distributions are roughly opposite to each other are covered by this range. The two such positions can be 212 μm and 296 μm, as indicated in FIG. 12 as an example, but they are not limited thereto. FIG. 13 is a graph showing amplitudes of light amount depending on the interval $D_N$ between the reference line 310 and the light-emitting element array 410 measured under the condition that the lens diameter L=about 300 μm and the width $W_C$=about 84 μm. The horizontal axis of the graph 1101 in FIG. 13 represents the interval $D_N$ [μm]. The vertical axis represents an amplitude (magnitude of variation) of light amount, that is, a proportion of a difference between the maximum amount of light and the minimum amount of light to the maximum amount of light. The smaller this amplitude is, the smaller the unevenness in the light amount will be. According to the graph 1101, the amplitude of light amount is suppressed to the lower level of about 0.04 (4%) to 0.06 (6%) in the range of $D_N$ from 169 μm to 253 μm, and the amplitude of light amount is much higher if $D_N$ goes out of this range. This suggests that the effect of suppressing the unevenness in light amount resulting from mutual cancellation of phase variations of light transmittance rate distributions can be obtained if the interval $D_N$ belongs to the range defined by the lower limit of 169 μm and the upper limit of 253 μm.

The phase variation pattern of light transmittance distribution depends solely on the geometric shape of the rod lens array 203. The degree of the mutual cancellation of phase variations depends on the interval $D_N$ and the width $W_C$ of the light-emitting element array 410. When a proportion of the width $W_C$ to the lens diameter L is constant, the lower limit $D_N$_MIN and the upper limit $D_N$_MAX of the interval $D_N$ can be scaled in accordance with the lens diameter L as follows:

If the proportion of the width $W_C$ to the lens diameter L is about 0.28 (=84/300), $$\text{the lower limit } D_{N\_MIN} = (169/300) * L \approx 0.56L$$

$$\text{the upper limit } D_{N\_MAX} = (253/300) * L \approx 0.84L$$

That is, the condition to obtain the effect of suppressing the unevenness in light amount in the case of $W_C/L \approx 0.28$ is that the interval $D_N$ between the reference line 310 and each light-emitting element array 410 belongs to the range from 0.56 to 0.84 times the lens diameter L ($0.56\,L \le D_N \le 0.84\,L$).

As an example of a different condition other than that of the above-described embodiment, assume a case where a light-emitting element array in which eight light-emitting elements 602 are arranged in the circumferential direction D2 and $W_C \approx 16.8$ μm, and a rod lens array with a lens diameter L≈600 μm are adopted. In this case, it is possible to significantly suppress the unevenness in light amount and form an image with good quality if the interval $D_N$ [μm] between the reference line and the light-emitting element arrays belongs to the range of $336 \le D_N \le 504$.

It should be noted that the interval $D_N$ represents the distance between the reference line 310 and the proximal side of the light-emitting element array 410 (the nearer side out of the two sides that are parallel to the reference line 310). Meanwhile, a similar range for the distance $D_F$ (=$D_N$+$W_C$) between the reference line 310 and the distal side of the light-emitting element array 410 can also be defined as follows:

If the proportion of the width $W_C$ to the lens diameter L is about 0.28, $$\text{the lower limit } D_{F\_MIN} = (253/300) * L \approx 0.84L$$

$$\text{the upper limit } D_{F\_MAX} = (337/300) * L \approx 1.12L$$

That is, the condition to obtain the effect of suppressing the unevenness in light amount in the case of $W_C/L \approx 0.28$ is that the interval $D_F$ between the reference line 310 and the distal edge of each light-emitting element array 410 belongs to the range from 0.84 to 1.12 times the lens diameter L ($0.84\,L \le D_F \le 1.12\,L$).

In the present specification, the term "about" added to the numerical values means that errors that inevitably occur at the time of manufacturing products and slight dimensional differences that do not impair the intended technical effect are tolerated. For example, in a case where the lens diameter L of the rod lens array is in the order of several hundred micrometers, the width $W_C$ of light-emitting element arrays may not strictly equal to 0.28 L, and may have an error up to one to several micrometers or so, for example. The same applies to the lower limit and the upper limit of the interval $D_N$ between the reference line and light-emitting element arrays. One of ordinary skill in the art will appreciate that the technical effect of the technology according to the present disclosure can be obtained even when there is such an error or a slight difference, and the use of the term "about" in the claims does not necessarily make the scope of invention ambiguous.

5. Summary

Thus far, various embodiments of the technology according to the present disclosure have been described in detail using FIGS. 1 to 13. In the above-described embodiments, a rod lens array constituted by two rows of lenses arranged in a close-packed manner, and a printed circuit board on which a plurality of light-emitting chips each having a light-emitting element array are arranged in a staggered manner along a reference line that is parallel to an axial direction of a photosensitive member are adopted in an exposure apparatus. The reference line is equidistant from a central line of a first lens row and a central line of a second lens row on the printed circuit board. A proportion of a width of the light-emitting element array in a circumferential direction of the photosensitive member to a lens diameter of the rod lens array is about 0.28. Then, each light-emitting chip is arranged on the printed circuit board such that an interval between the reference line and each light-emitting element array belongs to a range from 0.56 to 0.84 times the lens diameter, whereby it will be possible to effectively suppress unevenness in light amount in the axial direction of the photosensitive member and to form an image with high quality.

In the above-described embodiments, a light transmittance rate distribution of the rod lens array measured at a first position a first distance away from the reference line indicates a first pattern of phase variation, and a light transmittance rate distribution measured at a second position a second distance away from the reference line indicates a second pattern of phase variation. The width of the light-emitting element array in the circumferential direction of the photosensitive member covers both of the first and second positions, whereby the first and second patterns of phase variation are at least partially canceled by each other. As a result, the amplitude of light amount is reduced and the unevenness in light amount is suppressed. As long as such mutual cancellation of phase variations takes place, other design values may be employed for the width of light-emitting element arrays, the lens diameter, and the interval between the reference line and each light-emitting element array.

Although some specific numerical values have been used for explanations in this specification, these specific numerical values are mere examples, and the present invention is not limited to these specific numerical values used in the embodiments. Specifically, the number of light-emitting chips provided on one printed circuit board is not limited to twenty, and may be any number. The size of the light-emitting element array in each light-emitting chip 400 is not limited to four rows*748 columns, and may be any other size. The pitch in the circumferential direction and the pitch in the axial direction of the light-emitting elements are not limited to about 21.16 μm and about 5 μm, and may take any other values.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-127999, filed on Aug. 4, 2023 which is hereby incorporated by reference herein in its entirety.

What is claimed is:

1. An exposure apparatus comprising:

a printed circuit board on which a plurality of light-emitting chips each having a light-emitting element array are arranged in a staggered manner along a reference line that is parallel to an axial direction of a photosensitive member; and a rod lens array configured to image light from the plurality of light-emitting chips onto a surface of the photosensitive member, wherein the rod lens array is constituted by two rows of lenses arranged in a close-packed manner, the reference line is equidistant from a central line of a first lens row and a central line of a second lens row of the rod lens array on the printed circuit board, a proportion of a width of the light-emitting element array in a circumferential direction of the photosensitive member to a lens diameter of the rod lens array is about 0.28, and an interval between the reference line and each light-emitting element array belongs to a range from 0.56 to 0.84 times the lens diameter.

2. The exposure apparatus according to claim 1, wherein a light transmittance rate distribution of the rod lens array in the axial direction measured at a first position a first distance away from the reference line indicates a first pattern of phase variation;

a light transmittance rate distribution of the rod lens array in the axial direction measured at a second position a second distance away from the reference line indicates a second pattern of phase variation; and the width of the light-emitting element array in the circumferential direction covers both of the first position and the second position whereby the first pattern of phase variation and the second pattern of phase variation are at least partially canceled by each other.

3. The exposure apparatus according to claim 1, wherein the lens diameter of the rod lens array is about 300 micrometers, and the width of the light-emitting element array in the circumferential direction is about 84 micrometers.

4. The exposure apparatus according to claim 3, wherein the light-emitting element array has four light-emitting elements in the circumferential direction, and a pitch of the light-emitting elements in the circumferential direction is about 21.16 micrometers.

5. The exposure apparatus according to claim 1, wherein the light-emitting element array is an array of organic electro-luminescence (EL) elements.

6. An image-forming apparatus comprising:

an exposure apparatus; and a photosensitive member, wherein the exposure apparatus includes:

a printed circuit board on which a plurality of light-emitting chips each having a light-emitting element array are arranged in a staggered manner along a reference line that is parallel to an axial direction of a photosensitive member; and a rod lens array configured to image light from the plurality of light-emitting chips onto a surface of the photosensitive member, wherein the rod lens array is constituted by two rows of lenses arranged in a close-packed manner, the reference line is equidistant from a central line of a first lens row and a central line of a second lens row of the rod lens array on the printed circuit board, a proportion of a width of the light-emitting element array in a circumferential direction of the photosensitive member to a lens diameter of the rod lens array is about 0.28, and an interval between the reference line and each light-emitting element array belongs to a range from 0.56 to 0.84 times the lens diameter.

* * * * *